US012768429B2

(12) United States Patent
Klein et al.

(10) Patent No.: US 12,768,429 B2
(45) Date of Patent: Oct. 20, 2026

(54) DRAG CHAIN

(71) Applicant: IGUS GMBH, Cologne (DE)

(72) Inventors: Marcel Klein, Hennef (DE); Jörg Dommnik, Cologne (DE)

(73) Assignee: IGUS GMBH, Cologne (DE)

( * ) Notice: Subject to any disclaimer, the term of this patent is extended or adjusted under 35 U.S.C. 154(b) by 309 days.

(21) Appl. No.: 18/554,147

(22) PCT Filed: Apr. 7, 2022

(86) PCT No.: PCT/EP2022/059289
§ 371 (c)(1),
(2) Date: Oct. 5, 2023

(87) PCT Pub. No.: WO2022/214604
PCT Pub. Date: Oct. 13, 2022

(65) Prior Publication Data

US 2024/0200636 A1 Jun. 20, 2024

(30) Foreign Application Priority Data

Apr. 9, 2021 (DE) ..................... 20 2021 101 910.7

(51) Int. Cl.
*F16G 13/16* (2006.01)

(52) U.S. Cl.
CPC .................................... *F16G 13/16* (2013.01)

(58) Field of Classification Search
CPC .............................. F16G 13/16; H02G 11/006
See application file for complete search history.

(56) References Cited

U.S. PATENT DOCUMENTS 3,948,041 A 4/1976 Boerjesson
5,257,961 A 11/1993 Wehler et al.
(Continued)

FOREIGN PATENT DOCUMENTS

CN 1299447 6/2001
CN 1721731 1/2006
(Continued)

OTHER PUBLICATIONS

Translation of DE-19525478.*
(Continued)

*Primary Examiner* — Bobby Yeonjin Kim
(74) *Attorney, Agent, or Firm* — Secant IP, PLLC

(57) ABSTRACT

A drag chain comprising a plurality of chain links connected to one another in an articulated manner for guiding cables between two connection points, wherein opposing link plates and crosspieces of the chain links form a receiving space for the at least one cable, wherein the drag chain can be arranged and moved as a structure formed by a lower track, an upper track and a deflection region connecting same, with the upper track being placed on the lower track, and wherein the chain links of the lower track and/or the upper track are or can be fitted with additional elements, e.g. sliding elements, on the side facing the respective other track. The chain has an end-securing part with connection-securing means for securing the end-securing part to a connection point or said chain is secured to a stationary connection point by means of same. At least one wedge-shaped ramp-type element is provided on the end-securing part of the lower track, on the side facing the upper track, said ramp-type element comprising a pointed end and a broad end spaced apart from one another in the longitudinal direction of the chain. The wedge-shaped ramp-type element is or can be arranged on the end-securing part with its
(Continued)

longitudinal direction at least substantially parallel to the longitudinal direction of the chain, wherein, in the secured arrangement on the chain, the ramp-type element tapers in the direction leading away from the deflection region and the upper side of the ramp-type element facing the upper track forms a ramp-type surface for the upper track.

16 Claims, 5 Drawing Sheets

(56) References Cited

U.S. PATENT DOCUMENTS

| | | | | |
|---|---|---|---|---|
| 10,175,124 | B2 | 1/2019 | Hermey et al. | |
| 2008/0072564 | A1 | 3/2008 | Blase | |
| 2016/0290438 | A1 | 10/2016 | Komiya | |
| 2020/0325962 | A1 | 10/2020 | Hermey et al. | |
| 2021/0364063 | A1 | 11/2021 | Strack et al. | |
| 2022/0082185 | A1* | 3/2022 | Faith | F16L 3/015 |

FOREIGN PATENT DOCUMENTS

| | | | | |
|---|---|---|---|---|
| CN | 101032063 | | 9/2007 | |
| CN | 101501364 | | 8/2009 | |
| CN | 105745472 | | 7/2016 | |
| CN | 111465782 | | 7/2020 | |
| DE | 2417516 | | 11/1974 | |
| DE | 19512105 | | 8/1996 | |
| DE | 19525478 | | 1/1997 | |
| DE | 19525478 | A1 * | 1/1997 | H02G 11/006 |
| DE | 19647322 | | 5/1998 | |
| DE | 29807063 | | 6/1998 | |
| DE | 29802278 | | 6/1999 | |
| DE | 19952699 | | 6/2001 | |
| DE | 10035076 | | 1/2002 | |
| DE | 202017105644 | | 12/2017 | |
| DE | 2807714 | | 5/2018 | |
| EP | 0415029 | | 3/1991 | |
| EP | 0456537 | | 11/1991 | |
| ES | 2614782 | | 11/2016 | |
| JP | 1991096738 | | 4/1991 | |
| JP | 1993296370 | | 11/1993 | |
| JP | 2002-504655 | | 2/2002 | |
| JP | 2010121736 | | 6/2010 | |
| JP | 2013019431 | | 1/2013 | |
| TW | 200513606 | | 4/2005 | |
| WO | 2007/121716 | | 11/2007 | |
| WO | 2017/129805 | | 8/2017 | |

OTHER PUBLICATIONS

International Search Report from corresponding PCT Appln. No. PCT/EP2022/059289, dated Aug. 8, 2022. English translation attached.

English translation of International Preliminary Report on Patentability from corresponding PCT Appln. No. PCT/EP2022/059289, dated Oct. 19, 2023.

Office Action from related Taiwanese Appln. No. 111113434, dated Dec. 2, 2025. English translation attached.

Office Action with English translation for JP Application No. 2023-561688, mailed May 13, 2026, 5 pages.

Office Action for Chinese Application No. 202280033772.8, mailed May 29, 2026, 10 pages.

* cited by examiner

Fig. 4a
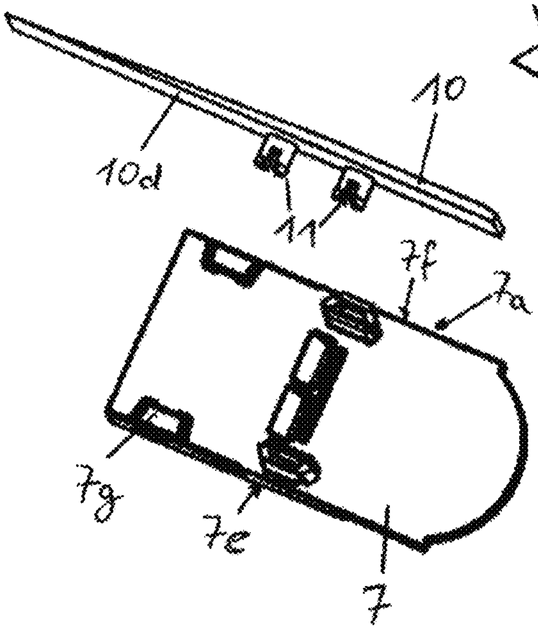
Fig. 4b
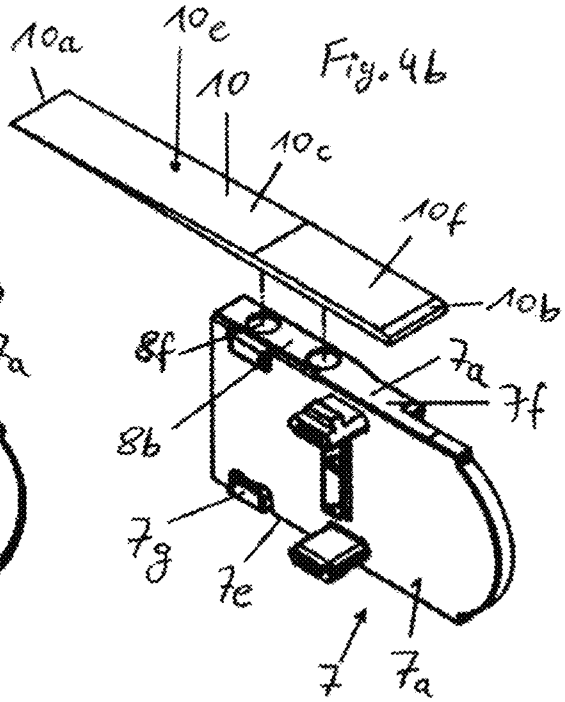
V-V (1:2)
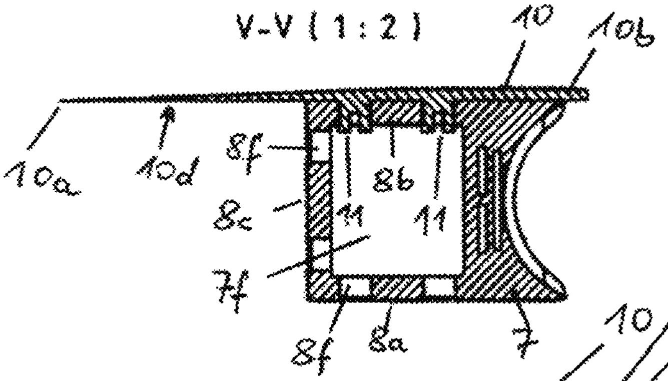
Fig. 5c
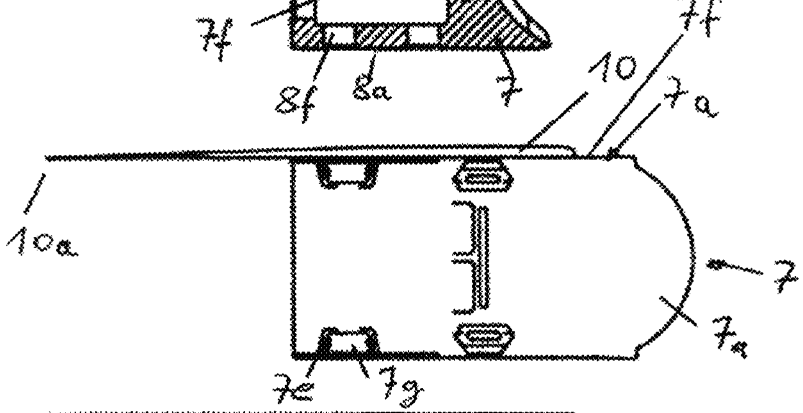
Fig. 5a
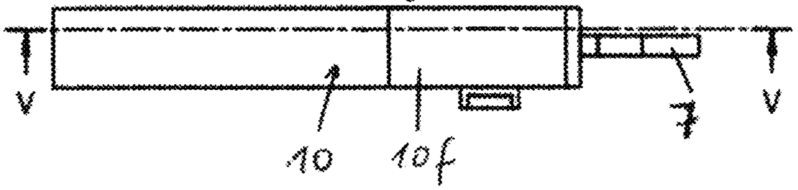
Fig. 5b

DRAG CHAIN

FIELD

The invention relates to a drag chain for guiding cables. Furthermore, the invention relates to an end-securing part for a drag chain and to a guide channel with a drag chain.

BACKGROUND

Drag chains, which are arranged forming a lower track, an upper track and a deflection region connecting these, are used in a variety of ways and have in many cases of application a considerable length of several meters or even several 10 meters. In the case of long chain lengths, the cable drag chain is usually moved with the upper track placed on the lower track, so that the upper track slides on the lower track. The drag chain is usually arranged in a guide channel which guides the drag chain laterally during its travel movement in order to prevent the upper track from sliding off sideways from the lower track. Slide rails are arranged on the guide channel to support the upper track when it is moved beyond the end region of the lower track, so that the length of the upper track is greater than that of the lower track. The slide rails are fixed at a level on the guide channel such that the upper side or sliding surface of the slide rails is arranged flush with the upper side of the lower track, so that the upper track is not offset in height when it moves from the lower track onto the slide rail. This is essential for a uniform travel movement of the chain. Such a guide channel is described, for example, in DE 195 12 105 C1.

Especially in the case of long drag chains, these are also often used with sliding elements, for example in the form of slide shoes or skids, which are interposed between the upper and lower tracks and protrude over the chain side plates to the opposite track. The sliding elements are generally arranged on the upper narrow sides of the chain links, which are arranged respectively facing the other track, or on the upper side of the crosspieces. The sliding elements serve to dampen noise and/or as a protection against wear when the upper track and lower track rest on each other during chain travel. The sliding elements can be integrally formed on the drag chain, as for example according to WO 2007/121716 A1 or DE 196 47 322 A1, or detachably attached to the chain, as for example according to EP 415029 A1 or EP 456537 A1.

There is a need on various occasions to convert a drag chain guided in a guide channel and to subsequently provide it with such sliding elements in order to be able to take advantage of their benefits. Occasionally, a drag chain that does not have such sliding elements is replaced by another drag chain with chain plates of the same plate height and thus usually also the same height of the receiving space for the cables and equipped with such sliding elements, in order to take advantage of their benefits. However, this requires that the chain links provided with such sliding elements have a greater overall height than chain links which do not have such sliding elements, but are otherwise identical. This would actually require that the slide rails on the guide channel also be repositioned in their height and adapted to the greater overall height of the chain with slide elements, so that the slide rails are again flush with or at the same level as the top of the chain equipped with slide elements. However, this requires additional assembly or conversion work, which can be considerable in the case of long guide channels.

The invention is therefore based on the problem of providing a drag chain or a guide channel with such a drag chain, in which the conversion effort is reduced if a drag chain is subsequently fitted with additional devices such as, in particular, sliding elements, or if a drag chain without additional devices such as, in particular, sliding elements is replaced by a drag chain with additional devices such as, in particular, sliding elements, with the height of the chain link plates being the same.

SUMMARY

According to the invention, the problem is solved by a drag chain, by an end-securing part and by a guide channel with drag chain.

According to the invention, the drag chain is designed in such a way that the end-securing part of the lower track has, on the side facing the upper track, at least one wedge-shaped ramp-type element comprising a pointed end and a broad end, the pointed end and the broad end being spaced apart from one another in the longitudinal direction of the chain, i.e. also in the longitudinal direction of the ramp-type element. The ramp-type element is arranged or can be arranged on the end-securing part with its longitudinal direction at least substantially parallel to the longitudinal direction of the chain, the ramp-type element, in the secured arrangement on the chain, tapering in the direction leading away from the deflection region and the upper side of the ramp-type element facing the upper track forming a ramp-type surface for the upper track.

In the secured arrangement of the ramp-type element on the chain, the broad end of the wedge-shaped ramp-type element (generally also: “ramp-type element”) is thus arranged facing the deflection region of the drag chain (generally also: “chain”) and the pointed end of the ramp-type element is arranged at the end of the ramp-type element facing away from the deflection region of the chain. The arrangement of the ramp-type element thus creates a ramp-type slope for the upper track in the transition region between the upper side of the slide rail, which supports the upper track and forms a sliding surface for it, and the upper side of the lower track provided with joint elements, which is formed by the sliding surfaces of the slide elements. This ramp-type slope at least partially or preferably completely compensates for the height offset between the upper side of the sliding rail and the upper side of the lower track.

Preferably, the additional element increasing the overall height of the plates is at least one sliding element by means of which the invention will be explained. If necessary, however, the additional element may also be of a different design. The invention is described with reference to sliding elements as an additional element, which sliding elements are particularly preferred, but in general the term “sliding element” can also be replaced by the term “additional element”, which additional element increases the overall height of the chain links when retrofitted to the chain.

When the upper track is extended, i.e. when the upper track extends beyond the lower track and then moves onto the slide rails, or when the upper track is retracted if the length of the upper track projecting from the lower track is shortened, the height offset between the slide rail and the upper side of the sliding element is thus preferably continuously compensated by the ramp-type slope. The underside of the upper track or the sliding elements thereof then slides/slide on the upper side of the ramp-type element during chain travel, which upper side thus also acts as a sliding surface. The slide rails can thus remain in their assembly arrangement, in which the slide rail upper side is arranged at least substantially at the level of the chain link plate narrow sides of the lower track, as is technically correct for a chain without additional sliding elements. Conversion of the slide rails with height adjustment to the greater overall height of the chain links with slide rails is therefore not necessary. By arranging the ramp-type slope, the danger is reduced or eliminated that when passing over the upper track via the transition region between the slide rail end regions and the first chain link of the lower track provided with at least one sliding element, chain links of the upper track could interlock with or touch down on sliding elements provided on the chain links of the lower track, in particular the end faces or boundary edges thereof, which would impair smooth travelling of the chain, in particular also when retracting the upper track. Even without conversion or readjustment of the mounting height of the slide rails on the guide channel, a very uniform travel movement of the chain is ensured during retraction but also during extension of the upper track. Furthermore, the ramp-type element reduces wear on the sliding elements and also on the slide rail, in particular at the end region of the slide rail which is arranged facing the end-securing part of the lower track. This is also the case when the upper track is extended, since otherwise, due to the height offset in said transition region, the links of the upper track would perform an uncontrolled height movement without support. Furthermore, the arrangement of the at least one ramp-type element also protects the link elements of the chain and thus increases their service life and results in lower noise emission compared to a corresponding arrangement of chain and guide channel without the use of a ramp-type element in accordance with the invention. Preferably, sliding elements are also provided on the underside of the upper track. Preferably, at least one sliding element is provided on each link of the chain.

Where reference is made to an "end-securing part", this is the end-securing part of the lower track, unless otherwise apparent from the context.

Preferably, the ramp-type surface at the broad end of the wedge-shaped ramp-type element in its secured arrangement on the chain is arranged at least substantially or exactly at the level of the sliding surface of the sliding element adjacent in the longitudinal direction of the chain. As a result, there is only a slight or preferably no height offset between the ramp-type surface of the ramp-type element and the sliding surface of the sliding element, so that a particularly smooth and even travel of the drag chain is ensured, in particular also at the transition region between the chain and the sliding rail. The advantages according to the invention are thus obtained in a particular way.

Preferably, the ramp-type slope of the ramp-type element which the upper track moves onto and contacts during the travel movement of the chain is designed as a plane. This plane is preferably aligned parallel to the joint axes about which the chain links can be pivoted relative to one another. This results in a particularly uniform travel movement of the chain, especially at high travel speeds. This also avoids force components onto the upper track section, which moves onto the ramp-type slope, in the vertical direction during chain travel. The "vertical direction" here corresponds to the direction of arrangement of the upper track and lower track one above the other. If necessary, the upper side or sliding surface of the ramp-type element can also have a certain curvature, but this should not be too strong, as this could otherwise lead to a bulging of the upper track when it is retracted relative to the lower track.

The ramp-type slope to which the underside of the upper track can ascend thus preferably has an incline in the mounting arrangement of the ramp-type element on the end-securing part, preferably a uniform or constant incline, in order to be able to bridge the said height offset.

The tapering region of the ramp-type element is generally preferably formed in such a way that the taper is created by a cross-sectional reduction of the ramp-type element, more specifically by a reduction of the cross-sectional height of the ramp-type element, more specifically of the material height of the ramp-type element. The direction of the height extension of the ramp-type element corresponds here to the direction of the height extension of the end-securing part and/or the guide channel.

The tapering region of the ramp-type element preferably tapers steadily or continuously, i.e. without elevations arranged in the region of the ramp-type slope. The tapering region of the ramp-type element preferably tapers with a constant incline over the longitudinal extent of the ramp-type slope.

The tapering region of the ramp-type element can form the region of the ramp-type slope of the ramp-type element at least partially or completely, in particular in the mounting arrangement of the ramp-type element on the end-securing part, particularly preferably including the arrangement of the ramp-type element on the respective slide rail.

The tapering region of the ramp-type element or the ramp-type slope preferably extends over ≥5-10% or ≥15-20%, particularly preferably ≥25-35% or ≥50-75% or optionally also up to 100% of the length of the ramp-type element. This provides a particularly flat ramp-type slope, which allows a particularly uniform and trouble-free passage of the chain upper track over the ramp-type element or from the slide rail onto the lower track of the of the chain.

If necessary, the broad end of the ramp-type element may also have a certain section with an upper side running horizontally, i.e. parallel to the slide rails, but which section preferably has only a short length in the longitudinal direction of the chain. This horizontal section is preferably arranged flush with the sliding surfaces of the link elements of the lower track. This horizontal section may extend over ≥5-10% or ≥15-20% or ≥25-50% or possibly more and/or over ≤50-75% or ≤25-35% of the length of the ramp-type element in the mounting arrangement of the ramp-type element. The securing means of the ramp-type element for securing the same to the end-securing part of the drag chain can thereby be stably arranged on the ramp-type element, preferably on the horizontal section of the same, and the ramp-type slope can have a relatively large longitudinal extent, which has proved particularly useful for the use of the ramp-type element.

If necessary, the broad end of the ramp-type element may also have a certain section with a flat underside and/or an underside which extends horizontally, i.e. parallel, to the slide rails and/or narrow sides of the end-securing part, but which section preferably has only a small length in the longitudinal direction of the chain. This horizontal section can preferably be applied flat against the narrow sides of the end-securing part or is applied flat in the mounting arrangement of the ramp-type element, particularly preferably over part of the length or the entire length of the overlapping region of the narrow side of the end-securing part and the ramp-type element. The planar underside of the ramp-type element is preferably given in the disassembled state and/or in the mounting arrangement of the ramp-type element. This plane and/or horizontal section of the ramp-type element underside can extend over ≥5-10% or ≥15-20% or ≥25-50% or possibly more and/or over ≤50-75% or ≤25-35% of the length of the ramp-type element in the mounting arrangement of the ramp-type element. This provides a stable support of the ramp-type element on the end-securing part.

The specified value "≥5-10%" or generally the specified value "≥x-y %", with "x" or "y" in each case as the specified number, is to be understood generally in the context of the invention as "in the range of 5%-10% or ≥10%" or "in the range of x %-y % or ≥y %", which applies correspondingly also to the specified value "x-y %", in the sense of "in the range of x %-y % or ≤x %".

Preferably, the driver and/or connection point for the end-securing part of the upper track is height-adjustable or floatingly mounted with respect to the distance of the same from the lower track, so that the different overall height of the chain links with additionally provided sliding elements can be compensated compared to the chain links without sliding elements.

Particularly preferably, the pointed end of the ramp-type element in its secured arrangement on the chain protrudes from the free end of the end-securing part of the lower track. The free end of the end-securing part is here generally the end of the end-securing part facing away from the deflection region of the chain. Due to the region of the pointed end of the ramp-type element protruding from the end-securing part, any gap between the end-securing part and the slide rail of the guide channel adjacent to the end-securing part is at least partially or completely bridged. In particular, the pointed end of the ramp-type element can also be arranged in overlap with the slide rail, with the underside of the ramp-type element preferably resting against the upper side of the slide rail. This at least partial or complete bridging of the gap enables the chain to travel particularly evenly in the transition region between the lower track end or the end-securing part on the one hand and the slide rail on the other. Furthermore, this allows the ramp-type slope of the ramp-type element to be of comparatively great length and thus the ramp-type slope to be relatively flat or to have only a slight incline. This improves smooth running of the chain when passing over said transition region and thus also reduces noise development during chain travel and increases the service life of the chain.

The ramp-type slope preferably has an angle of ≤20° or ≤15° or ≤10°, in particular also ≤5° or ≤3° or ≤2° to the straight connecting line of the narrow sides of the link plate of the lower track and/or to the underside of the ramp-type element in its secured arrangement on the chain.

The height of the ramp-type element at the free pointed end may be ≤40% or ≤30°, preferably ≤20% or ≤10%, or about 5%, of the height of the ramp-type element at the broad end.

The underside of the ramp-type element in its secured arrangement on the chain is preferably plane.

Preferably, the ramp-type element is arranged on the side parts of the end-securing part. The underside of the ramp-type element preferably lies flat against the side parts of the end-securing part, stabilizing the latter in position. The underside of the ramp-type element is the side of the ramp-type element opposite the ramp-type slope, which enclose an angle between them to form the wedge.

Preferably, a ramp-type element is arranged on each of the two side parts of the end-securing part facing the upper track. If necessary, only one ramp-type element can be provided that preferably extends over and bridges the two side parts of the end-securing part.

Generally within the scope of the invention, the side parts of the end-securing part are preferably arranged parallel to the side plates of the lower track and are preferably coupled to the side parts of the chain link of the lower track adjacent to the end-securing part and fastened thereto in a tension-absorbing manner in the longitudinal direction of the chain. The side parts of the end-securing part preferably couple in an articulated manner to the side plates of the chain end link of the lower track. The "end link of the chain or of the lower track" is generally understood to be the chain link which couples directly to the end-securing part of the chain and is preferably connected thereto in articulated manner. The chain thus has two chain end links, corresponding to the two end sections of the chain.

Generally preferably, the ramp-type element is arranged in extension of the sliding surfaces of the sliding elements in the longitudinal direction of the chain. This provides a linear continuous, preferably straight running surface of the lower track including the ramp-type element in the longitudinal direction of the chain, which running surface supports the upper track when the upper track is moved in the transition region between the slide rails and the lower track. The slide rails arranged on the guide channel are preferably arranged in extension of the contact surfaces of the lower track and the ramp-type element for the upper track. The arrangement of the ramp-type element on said side surfaces or side plates also provides the widest possible and therefore stable support for the upper track.

The side parts of the end-securing part can be of frame-shaped design for example or have a frame-shaped section, wherein the frame can be of closed design on one side facing away from or preferably facing the receiving space for the cable. The side parts of the end-securing part are preferably connected to each other by a crossbar which stabilizes the end-securing part and can act as a spacer between the side parts. The end-securing part can also have a crossbar for holding strain relief elements for the cables guided by the chain. Here, at least one cross-member may be arranged on the side of the end-securing part facing the upper track and/or the side of the end-securing part facing away from the upper track, respectively. If necessary, the one or more cross-member(s) of the end-securing part may be integrally or detachably connected to the side parts of the end-securing part. Preferably, the cross-member(s) of the end-securing part are arranged parallel to the crosspieces of the chain links. It is understood that the at least one or more cross-member(s) of the end-securing part may also be plate-shaped. Preferably, a ramp-type element is arranged on each of the two side parts of the end-securing part and, if necessary, a ramp-type element can also be provided which connects the two side parts of the end-securing part to one another.

Preferably, the ramp-type element is securable or secured to the end-securing part of the lower track. This provides a structurally compact design and allows the drag chain to be retrofitted in a simple manner by subsequent arrangements of the ramp-type element.

Preferably, the ramp-type element is or can be detachably secured to the end-securing part. This makes it particularly easy to retrofit a chain with at least one or more ramp-type elements when the chain is retrofitted with sliding elements or a chain without sliding elements is replaced by a chain with sliding elements.

Particularly preferably, the ramp-type element is arranged on or secured to the end-securing part of the lower track, in particular in a detachable manner. The ramp-type element is thus arranged close to the end of the slide rail facing the end-securing part. The pointed end of the ramp-type element can thereby be arranged relatively close to the securing region of the ramp-type element with the end-securing part, thus creating a stable design. Forces acting on the ramp-type element when the upper track is moved can thus be absorbed particularly favorably by the securing regions of the ramp-type element on the end-securing part. Furthermore, the arrangement of the ramp-type element on the end-securing part provides a particularly smooth transition between the chain end link of the lower track and the slide rail, resulting in a particularly smooth travel movement of the chain when the upper track passes from the slide elements of the lower track onto the slide rail, or correspondingly in the opposite direction. Furthermore, the securing of the ramp-type element to the end-securing part is particularly advantageous because the latter is fixed in a stationary and preferably positionally invariable manner to the connection point, such as a supporting structure or the floor of a building. Furthermore, as a rule, the guide channel is also fixed to the floor or a supporting structure which are each preferably arranged in a fixed position. This provides a particularly simple and permanent arrangement or securing of the ramp-type element to the end-securing part, since the connecting element with its securing regions is thereby exposed to particularly low mechanical stresses during chain travel, such as also vibrations or other alternating loads. Forces acting on the ramp-type element during chain travel can thus be absorbed particularly easily via the end-securing part and transferred to the floor or the supporting structure.

Preferably, the end-securing part has several connection point securing regions for securing it to a connection point by means of which the end-securing part can be secured to the connection point, preferably in a fixed position and especially preferably in a manner secured against rotation and/or displacement. The multiple connection point securing regions allow the end-securing part to be secured to different connection points in different spatial arrangements. For example, identically designed end-securing parts can be provided at both ends of the chain, by means of which the lower track or the upper track can be secured to the respective connection point. Thus, when the end-securing part is secured to the connection point, one of the connection point securing regions is used for the corresponding securing, while the other connection point securing regions are unused with respect to the securing of the end-securing part in a connection point. For example, connection point securing regions can be provided on an end-securing part on an upper narrow side and/or on a lower narrow side and/or on an end side of the same facing the slide rails, wherein the narrow sides of the end-securing part correspond to the narrow sides of the chain plates. In accordance with the invention, the ramp-type element is preferably designed in such a way that it is secured to a connection point securing region of the end-securing part or is designed for securing to the latter, preferably to a narrow side of the latter. This also applies in particular to the securing elements of the ramp-type element. Preferably, the securing regions or elements of the ramp-type element are configured to correspond to the connection point securing regions of the end-securing part.

The securing elements of the ramp-type element which can be fixed to a connection point securing region of the end-securing part are preferably designed as form-fitting and/or force-fitting means, preferably as clamping and/or latching means. This provides a structurally particularly simple design and makes retrofitting of the drag chain or the system of drag chain and guide channel particularly simple and fast. Preferably, the fastening elements of the ramp-type element are integrally formed thereon, which facilitates the assembly of the ramp-type element to the chain.

Preferably, the securing elements of the ramp-type element correspond to the securing elements of the connection point securing regions of the end-securing part, by means of which the latter can be fixed to a connection point. This makes it much easier to retrofit the chain with the at least one ramp-type element. Additional securing devices for the ramp-type element on the chain are thus dispensable. The securing elements of the ramp-type element for fixing the latter to the chain are preferably arranged on the underside of the ramp-type element. The assembly of the ramp-type element is thereby simplified.

If necessary, though less preferred, the ramp-type element can also be fixed to a cross-member of the end-securing part.

According to a preferred embodiment, the ramp-type element is designed to be elastically deformable, and in a particularly preferred embodiment the ramp-type element is designed to be arcuate in the disassembled state. In a view of the ramp-type element from the underside thereof, the ramp-type element is preferably concave in shape. When the ramp-type element is arranged on or secured to the chain, in which the underside of the ramp-type element is preferably at least substantially rectilinear, the pointed end of the ramp-type element can thus bear against the slide rail with a preload. This avoids vibrations or oscillations of the ramp-type element when the upper track moves up the ramp-type element or moves away from it, which ensures particularly safe operation of the drag chain or the system of chain and guide channel retrofitted with the ramp-type element.

According to another preferred embodiment, the ramp-type element is at least substantially rigid. This reduces or avoids vibrations of the ramp-type element or a spring-back of the same when the upper track moves up the ramp-type element or is removed from the same.

Preferably, the ramp-type surface of the ramp-type element or the entire ramp-type element is made of a material with low sliding friction and/or high wear resistance. This increases smooth running of the chain when it is moved in contact with the ramp-type element and reduces wear.

Preferably, the length of the ramp-type element is greater than/equal to 0.125 times or greater than/equal to 0.25 times or preferably greater than/equal to 0.5 times or greater than/equal to 0.75 times the length of the end-securing part, particularly preferably the length of the ramp-type element is greater than/equal to the length of the end-securing part. Due to this comparatively great length of the ramp-type element, the ramp-type surface can have a particularly low incline, as a result of which the chain runs particularly smoothly when the upper track moves from the slide rails via the ramp-type element onto the lower track or is moved in the opposite direction. The advantages according to the invention are thus obtained in a special way. Preferably, the length of the ramp-type element is greater than the distance between the front end edges of the sliding elements of the upper track directly successive in the direction of travel of the chain, for example greater than/equal to 1.15 or greater than/equal to 1.25 of the same, so that when a given sliding element slides off the ramp-type element, the following sliding element has already moved up the ramp-type element, so that the ramp-type element is permanently pressed against the end-securing part and/or the guide rail by the weight of the upper track during its travel, which makes unintentional loosening of the ramp-type element more difficult or prevents it, in particular also during rapid chain travel. The length of the ramp-type element can be less than/equal to 2 times or less than/equal to 1.5 times or less than/equal to 1.25 times the length of the end-securing part, whereby also in the mounting arrangement of the ramp-type element the latter can have a high degree of stability, also against dynamic forces, when the upper track moves up or down from the ramp-type element, which could otherwise lead for example to undesired vibrations of the pointed end of the ramp-type element.

The pointed end of the ramp-type element is preferably not provided with securing means for securing the ramp-type element to another component, such as a slide rail or a floor.

The invention further comprises an end-securing part for a drag chain or for a chain according to the invention, wherein at least one wedge-shaped ramp-type element is arranged on or secured to the end-securing part.

The invention further comprises a guide channel with a drag chain. The drag chain is guided laterally by the guide channel during its travel, in order to prevent the upper track from slipping off the lower track and/or to ensure the travel of the chain according to the direction defined by the guide channel, wherein the travel path of the chain is generally rectilinear, although not limited thereto, i.e. it can also be arcuate, for example. The guide channel has at least one slide rail running in the longitudinal direction of the guide channel, and the upper track of the chain can be dropped or placed on the slide rail. As a rule, at least one slide rail is arranged on each of the two legs of the guide channel which surround the chain on both sides and guide it laterally, preferably opposite one another on both channel legs. The slide rails support the upper track when the latter is extended beyond the end-securing part of the lower track, and the upper track thus has a greater length than the lower track. The upper sides of the slide rails support the upper track in this case. The slide rails preferably extend in width at least over the width of the chain link plates, preferably at least substantially over the widths of the sliding elements of the chain. The slide rails are preferably arranged horizontally, but, if necessary, the respective slide rail can also be arranged with an inclination to the horizontal spatial direction. The slide rails are preferably designed in a straight line, particularly preferably at the free end region of the guide channel or over the entire longitudinal extent of the respective slide rail, but, if necessary, the slide rails can also be designed in an arc shape with respect to their transverse extent and/or height extent. If necessary, instead of two slide rails on the two opposite sides of the guide channel, only one slide rail can be provided, which extends at least substantially over the width of the interior of the guide channel. The slide rails are preferably positively fastened to the guide channel, for example by screwing or hooking. The slide rails are preferably fixed to the guide channel in a stationary manner by fastening means.

The guide channel is generally preferably at least substantially U-shaped. The guide channel may extend generally over the entire length of the chain, in particular with respect to the maximum travel of the upper track in both travel directions thereof, i.e. with maximum length of the upper track or with maximum length of the lower track.

Preferably, the wedge-shaped ramp-type element is arranged on the chain, in particular on the end-securing part, in such a way that it bridges a gap between the end-securing part and the slide rail at least partially or preferably completely. The pointed end of the ramp-type element is here preferably arranged at least substantially flush with the slide rail, so that it is arranged at the level of the slide rail upper side, i.e. the bearing surface for the upper track. This substantially increases smooth running of the chain, reduces noise emissions during travel of the chain and increases the service life of the chain if, due to retrofitting of a chain with sliding elements or due to use of a chain with additional sliding elements, there is a height mismatch of the slide rails relative to the chain.

Preferably, the ramp-type element is arranged on the chain, in particular the end-securing part, in such a way that it overlaps the end region of the at least one slide rail or engages over the slide rail at the upper side thereof with the pointed end. The pointed end of the ramp-type element can lie loosely against the slide rail. Preferably, the pointed end is in contact with the slide rail or slide rail upper side with a certain contact pressure in order to be able to absorb dynamic forces that occur when the upper track moves up or down from the ramp-type element. The contact pressure can be exerted by having an elastic ramp-type element which is concave from the underside and has a smaller curvature of the underside or a straight underside in its secured arrangement on the chain, so that the elastic restoring force exerts a contact force. Preferably, the end region of the ramp-type element lies against the slide rail without a gap.

In its secured arrangement on the chain, the ramp-type element may extend over 0.1 times or more, or 0.2 times or more, for example approximately half its length or more over the slide rail, whereby the ramp-type slope of the ramp-type element is not very steep and therefore the chain has a high running smoothness even at high travel speeds.

In the mounting arrangement of the ramp-type element on the end-securing part, preferably with the ramp-type element abutting the slide rail, the underside of the ramp-type element facing the end-securing part or the slide rail extends horizontally with respect to the spatial direction or in straight-line extension and flush with the upper side of the narrow side of the end-securing part.

Generally within the scope of the invention, preferably a chain with a connection point centered with respect to the chain length is provided, i.e. a chain with a so-called "center feed". Accordingly, with maximum travel of the upper track in the forward and reverse directions, the connection point and the end-securing part of the lower track are thus arranged in the middle of the entire travel distance of the chain. In this case, the end regions of the slide rails are arranged adjacent to the end-securing part of the lower track, but usually with a certain gap or distance between them.

BRIEF DESCRIPTION OF THE DRAWINGS

The invention will be described below with reference to an exemplary embodiment. All features of the embodiment are generally disclosed within the scope of the invention independently of each other or in combination with each other. In the attached drawing it is shown by:

FIGS. 4a-4b: an end-securing part with a ramp-type element corresponding to FIGS. 1 to 3 in an exploded view in a first and a second perspective view;

FIGS. 5a-5c: an end-securing part with a ramp-type element corresponding to FIGS. 1 to 4 in a secured arrangement of the ramp-type element, in a side view (FIG. 5a), in a plan view (FIG. 5b) and in a sectional view V-V according to FIG. 5b (FIG. 5c);

DETAILED DESCRIPTION

Figure 1C:
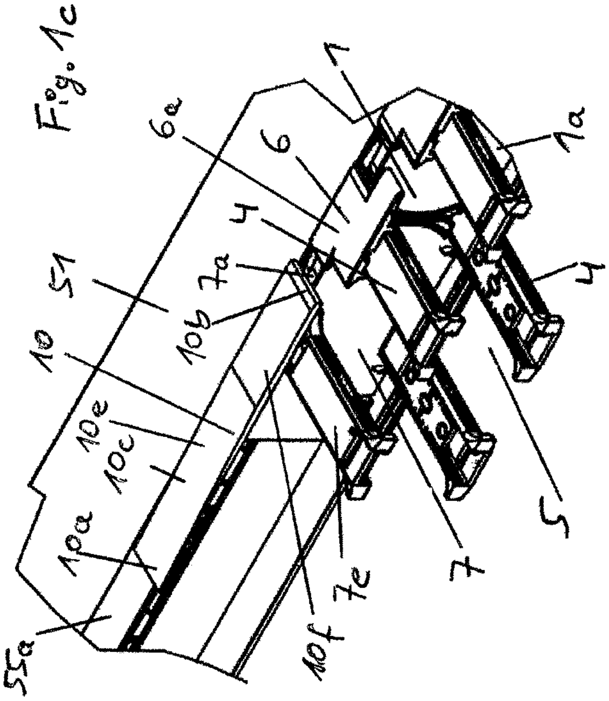
FIGS. 1*a*-1*c*: a section of a guide channel with a slide rail and a drag chain according to the invention, which is provided with a ramp-type element, in a side view (FIG. 1*a*), in a detailed view (FIG. 1*b*) and in a perspective view (FIG. 1*c*)

FIGS. 1 to 6 show an exemplary embodiment of a drag chain 1 according to the invention with a ramp-type element 10 and its arrangement in a guide channel 50 with a sliding element 55. The drag chain 1 is also disclosed herein independently of the guide channel 50. The end-securing part 7 with the ramp-type element 10 is also disclosed herein independently of the chain 1 and/or the guide channel 50.

The guide channel 50 is generally at least substantially U-shaped and has opposing legs 51. The guide channel preferably extends over the entire length of the chain in its opposite end positions of travel and guides the chain 1 or the upper track 1b laterally during the travel movement of the chain. The guide channel is provided with slide rails 55 on both opposite legs 51, each of which supports the upper track moved onto the slide rails 55.

Figure 2A:
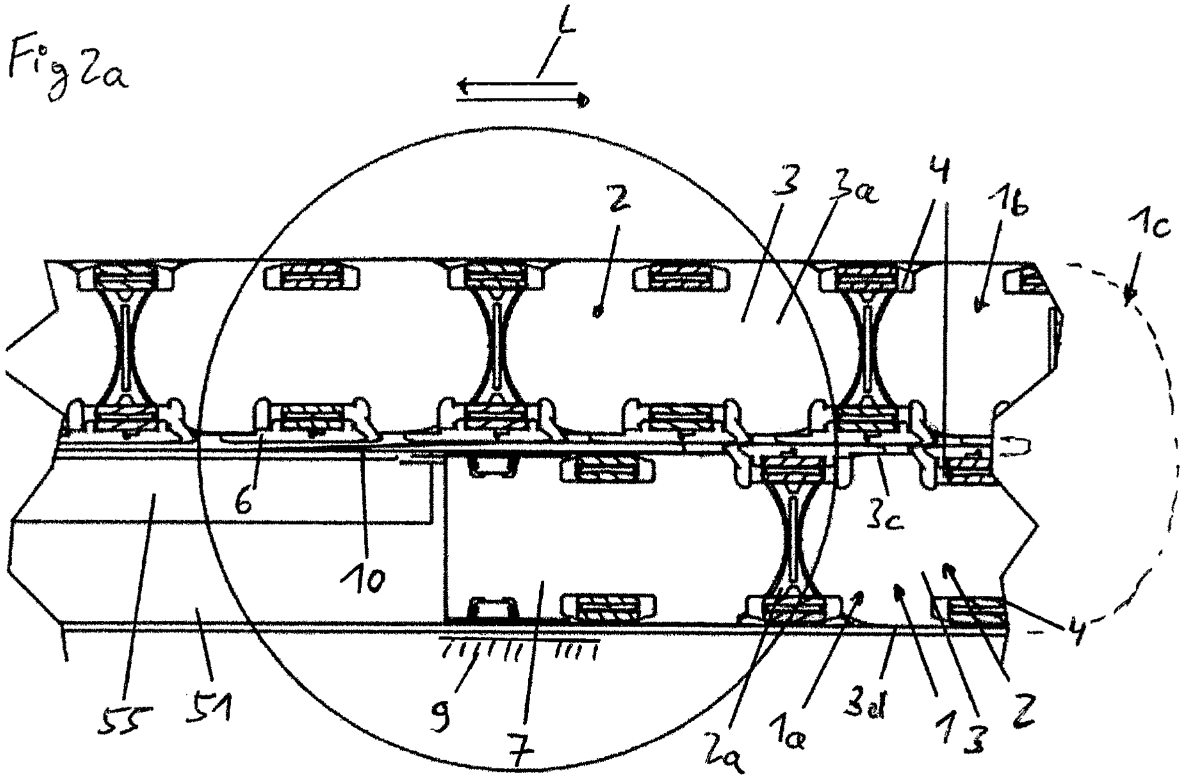
FIGS. 2*a*-2*b*: a view of a guide channel with a drag chain according to the invention corresponding to FIG. 1 with the upper track placed on a slide rail, in a side view and in a detailed view.
Figure 2B:
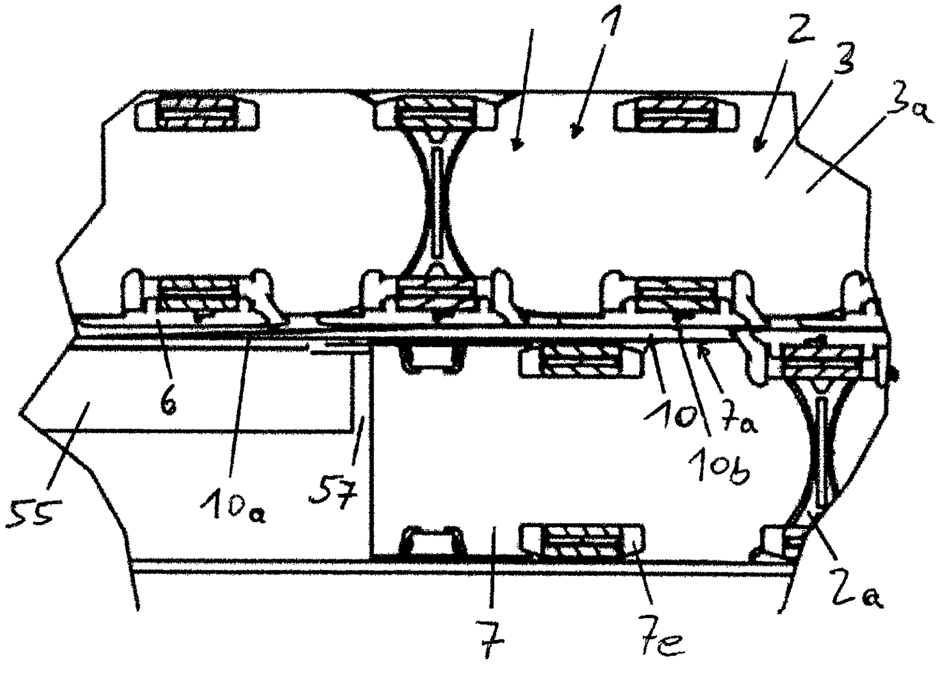
Figure 3A:
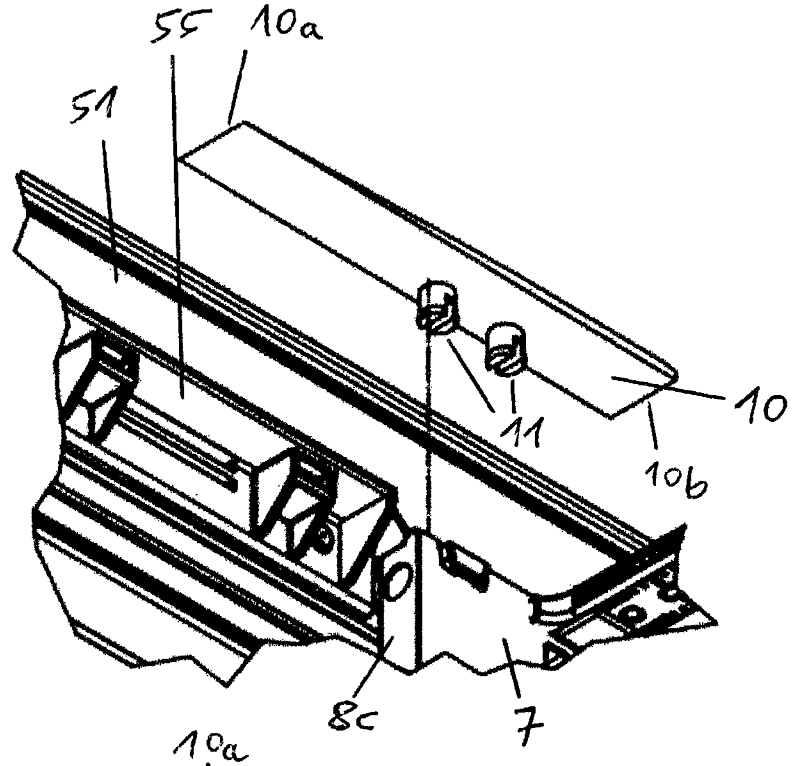
FIGS. 3*a*-3*b*: an exploded view of the transition region between the end-securing part and the slide rail in a perspective view from below (FIG. 3*a*) and from above (FIG. 3*b*), with an end-securing part and a ramp-type element according to FIGS. 1 and 2.
Figure 3B:
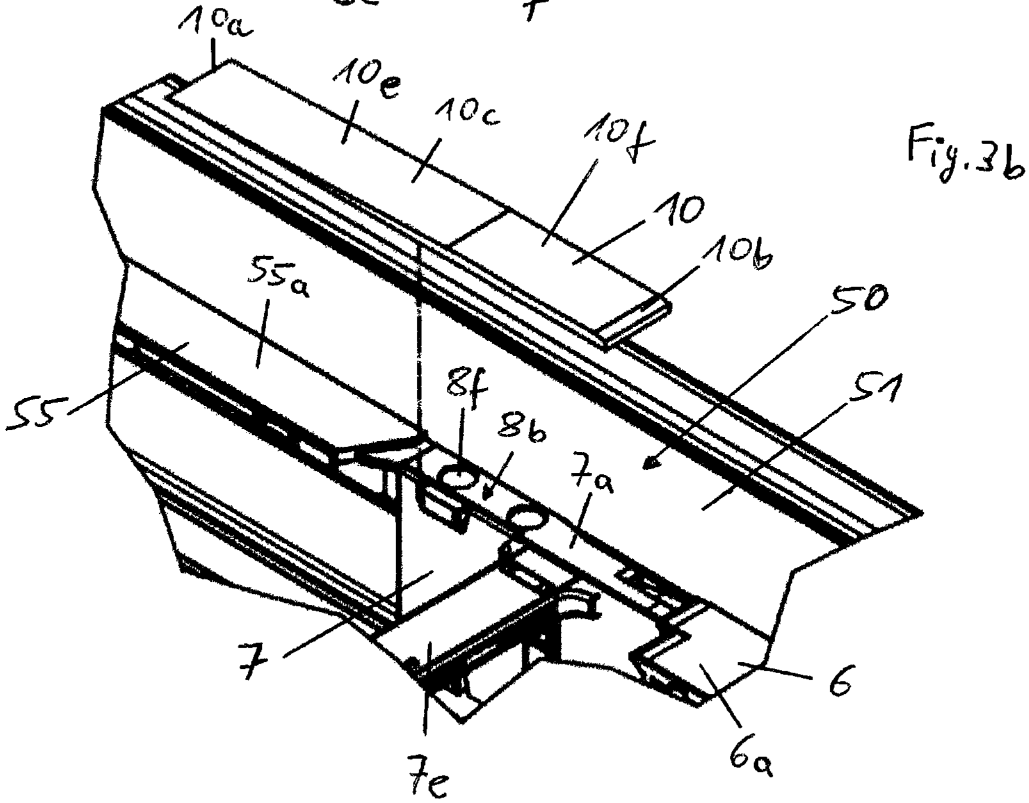
Figure 6B:
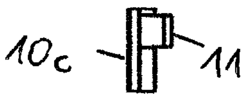
FIGS. 6a-e: a ramp-type element according to the invention in a top view (FIG. 6a), end view (FIG. 6b), side view (FIG. 6c), view from below (FIG. 6d) and in a perspective view (FIG. 6e).
Figure 6A:
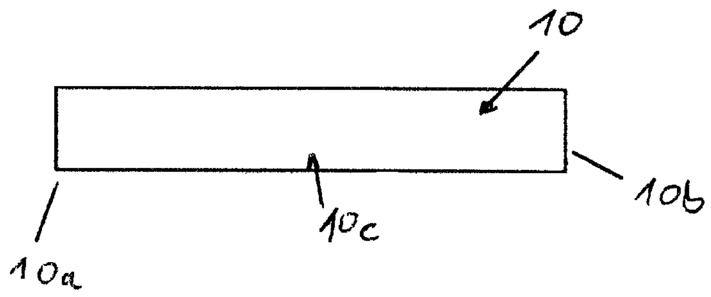
Figure 6C:
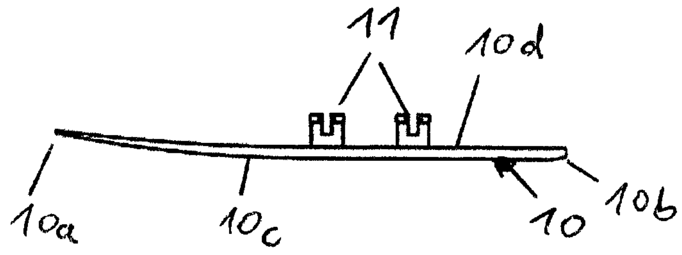
Figure 6D:
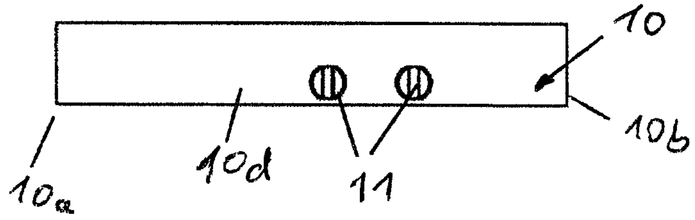
Figure 6E:
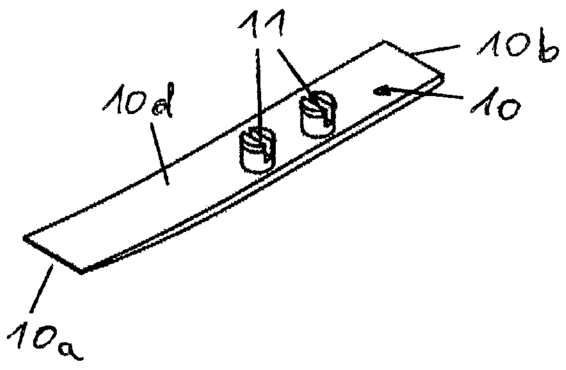

The drag chain 1 for guiding cables between two connection points that are movable relative to one another, preferably longitudinally displaceable relative to one another, comprises a plurality of chain links 2 that are connected to one another in an articulated manner and succeed each other in the longitudinal direction of the chain. The chain links 2 each have opposite and laterally spaced-apart link plates 3, each having an inner side surface 3a and an outer side surface and each having two narrow sides 3c, 3d which are opposite in relation to the link plate height. At least some, in this case all, of the chain links 2 have at least one, in this case two, crosspieces 4 connecting the link plates 3 of the respective chain link to one another, the mutually opposite link plates and the crosspieces forming a receiving space 5 for the at least one cable. The chain 1 can be arranged and moved by forming a lower track 1a, an upper track 1b and a deflection region 1c connecting these, with the upper track being deposited on the lower track, as shown in FIG. 2. The chain links of the lower track and/or upper track, here of both tracks, are equipped or can be equipped with additional elements 6 on the side facing the respective other track, which additional elements are designed here in the form of sliding elements. The embodiment is described by means of the sliding elements, which also represents a particularly preferred embodiment, though the invention is not limited thereto. The chain has an end-securing part 7 which is coupled to an end link 2a of the lower track 1a of the chain. The chain has alternately arranged inner and outer link plates forming a link plate strand, though the invention is not limited thereto. The end-securing part 7 has connection-securing regions 8 for securing the end-securing part 7 to a connection point. Securing means (not shown) such as screw bolts can be used for securing, or the end-securing part 7 is secured to a stationary connection point using said securing means.

The sliding elements 6 of the chain have a longitudinal extension direction in the chain longitudinal direction L. The sliding surfaces 6a of the sliding elements 6 can form a continuous sliding surface for the upper track 1b in the longitudinal direction L of the chain.

The end-securing part 7 of the lower track 1a is provided on the side 7a facing the upper track with at least one wedge-shaped ramp-type element 10, the ramp-type element 10 having a pointed end 10a and a broad end 10b which are spaced apart from one another in the longitudinal direction L of the chain. The ramp-type element 10 is arranged or can be arranged with its longitudinal direction at least substantially parallel to the longitudinal direction L of the chain on the end-securing part. In its secured arrangement on the chain 1, the ramp-type element 10 tapers towards the direction facing away from the deflection region 1c. The upper surface 10c of the ramp-type element 10 facing the upper track forms a ramp-type surface for the upper track 1b and acts as a sliding surface for the upper track. The ramp-type surface or the entire ramp-type element is made of a material with low sliding friction and/or high wear resistance.

In this case, the ramp-type slope presents an angle of about 2° to the horizontal and thus also to the straight connecting line of the link plate narrow sides 3c of the lower track. This angle also corresponds to the angle between the upper side 10c, i.e. the sliding surface, and the lower side 10d of the ramp-type element 10. Here, the height of the ramp-type element at the free pointed end amounts to about 5% of the height of the ramp-type element at the broad end, so that the upper side acting as the ramp-type surface has a long and flat incline and the sliding of the upper track onto the ramp-type element is facilitated, whereby the advantages according to the invention, such as for example smooth running of the chain, are obtained in a specific way.

The width of the ramp-type element 10 corresponds at least substantially to the width of the slide rails 55 and/or the width of the sliding elements or additional elements 6 of the lower track. However, the ramp-type element 10 may also extend at least substantially over the entire width of the end-securing part and overlap and/or connect the side parts 7a of the end-securing part. This facilitates retrofitting of the drag chain, since only one ramp-type element has to be retrofitted to the end-securing part 7.

In the secured arrangement of the ramp-type element 10 on the chain, the upper side 10c or the ramp-type surface thereof is arranged at the broad end 10b of the ramp-type element at the level of the upper side of the additional element or at the level of the sliding surface 6a of the sliding element 6 adjacent in the longitudinal direction of the chain.

The ramp-type slope 10e of the ramp-type element 10 the upper track moves onto and contacts during the travel movement of the chain, is designed as a plane. Optionally, the broad end 10b of the ramp-type element further has an end section 10f with an upper side extending horizontally, i.e. parallel to the slide rails 55 or to the connection line of the narrow sides of the link plates in the secured arrangement of the ramp-type element on the chain 1. The securing means 11 of the ramp-type element, here in the form of protruding pins, are preferably arranged at least partially or completely on the particularly stable end section 10f.

In the secured arrangement of the ramp-type element 10 on the chain 1 or on the end-securing part 7, the pointed end of the ramp-type element protrudes from the free end of the end-securing part facing away from the deflection region 1c of the chain, namely according to the exemplary embodiment in this case by approximately half the length of the ramp-type element (see FIG. 5).

The ramp-type element 10 is arranged on the side parts 7a of the end-securing part 7. A respective ramp-type element is arranged on each of the two side parts 7*a*, and the ramp-type elements are formed mirrored to one another. The explanations regarding "the ramp-type element" apply to both elements. The ramp-type element 10 can be or is secured to the end-securing part, in this particular case to a side part thereof. The ramp-type element can be or is detachably fixed to the end-securing part 7. The securing elements 11 of the ramp-type element 10 are designed as form-fitting and/or force-fitting means, in this case as clamping and/or latching means in the form of the pin-shaped projections. The securing means 11 of the ramp-type element are arranged on the underside of the ramp-type element 10.

The ramp-type element can be plug-fitted to the respective end-securing part 7, in particular to the side part 7*a* thereof, which can generally apply within the scope of the invention and which facilitates the assembly of the ramp-type element to the chain. The plug-fitting operation may generally be performed from the open top of the channel which faces and/or is parallel to the top 55*a* of the slide rail, for which purpose the ramp-type element is suitably configured. The plug-fitting operation is preferably performed perpendicularly to the narrow side 7*f* of the side part 7*a* of the end-securing part 7.

Generally within the scope of the invention, the ramp-type element with its securing means is designed in such a way that it can be arranged in the guide channel without dismantling the end-securing part 7 and/or can be fixed and mounted to the end-securing part without detaching the end-securing part 7 from its connection point 9. The securing means 11 are preferably integrally formed on the ramp-type element. Preferably, the ramp-type element can be plug-fitted to the end-securing part from the open top of the channel. In addition to the translational change in position of the ramp-type element with respect to the end-securing part, the plug-fitting operation may optionally also comprise a translational or other change in position in another direction, for example in the longitudinal direction of the slide rail, which is performed, for example, when the corresponding securing means of the ramp-type element is arranged in its fastening receptacle on the end-securing part.

The end-securing part 7 has a plurality of connection point securing regions 8*a*,8*b*,8*c* for securing to the or a connection point 9, so that the end-securing part 7 can be used for fixing the chain at connection points of different spatial positions or, for example, end-securing parts of identical design can also be used for selectively securing the end links of the upper and lower tracks. Thus, when connection point securing region 8*a* is used for securing the end-securing part, at least one other connection point securing region 8*b* is unused for said securing of the part 7. The connection point securing region 8*a*-8*c* can each be fixed to the floor or to a supporting structure in a manner that prevents rotation, for which purpose they each have, for example, two through-openings 8*f* for the passage of securing means. The connection point securing regions 8*a*-8*c* are each arranged on a frame-shaped section 7*f* of the end-securing part 7. The connection point securing regions 8*a* and 8*b* are here arranged on opposite narrow sides 7*e*, 7*f* of the side parts 7*a* of the end-securing part, a further connection point securing region 8*c* being—optionally—provided on the end face of the end-securing part, to which the ramp-type element 10 could be secured, if necessary, though this would be spatially disadvantageous. By using the connection point securing regions for securing and fixing the ramp-type element to the part 7, retrofitting of the chain is considerably facilitated and additional securing means are not needed. In addition, because of that easy accessibility of the connection point securing region 8*b* arranged on the upper narrow side, the subsequent installation of the ramp-type element can be easily carried out.

The securing means 11 of the ramp-type element thus correspond to the connection point securing regions 8 of the end-securing part 7, preferably also with respect to the spatial distance from one another. The ramp-type element is generally fixed or fixable to the end-securing part in a manner secured against rotation, in this case by means of two spaced securing means 11. Generally, the ramp-type element is supported flat on the respective narrow side of the end-securing part.

According to one variant, the ramp-type element is at least substantially rigidly formed, preferably with a plane underside 10*d*, as shown in FIGS. 1 to 5.

According to another preferred variant, as shown in FIG. 6, the ramp-type element 10 is formed in an arcuate shape in the disassembled state, preferably concave when viewed from the underside 10*d*, and elastically deformable. In the secured arrangement on the end-securing part, the ramp-type element is preferably arranged stretched, with a preferably plane underside 10*d*, as shown in FIGS. 1 to 5, wherein in this connection the FIGS. 4 and 5 are to be understood as exploded views of the end-securing part with the ramp-type element in its secured position on the chain and in contact with the slide rail according to FIGS. 1 and 2. Due to the abutment of the pointed end 10*a* against the slide rail 55, the pointed end 10*a* exerts a contact force on the slide rail 55, thus preventing undesired lifting of the pointed end from the slide rail when the chain travels.

In this case, the length of the ramp-type element is greater than the length of the end-securing part, as a result of which the incline of the upper surface 10*c* acting as a ramp-type surface is particularly low.

In this case, the end-securing part 7 has two crosspieces 7*e* which are arranged in the region of the narrow sides thereof and connect the side parts 7*a* for stabilizing the end-securing part 7. Strain relief means are provided or can be arranged on the end-securing part for strain relief of the guided cable(s). For this purpose, the end-securing part 7 has securing regions 7*g* for fastening a cross-member (not shown), to which strain relief elements can be fastened.

Figure 1A:
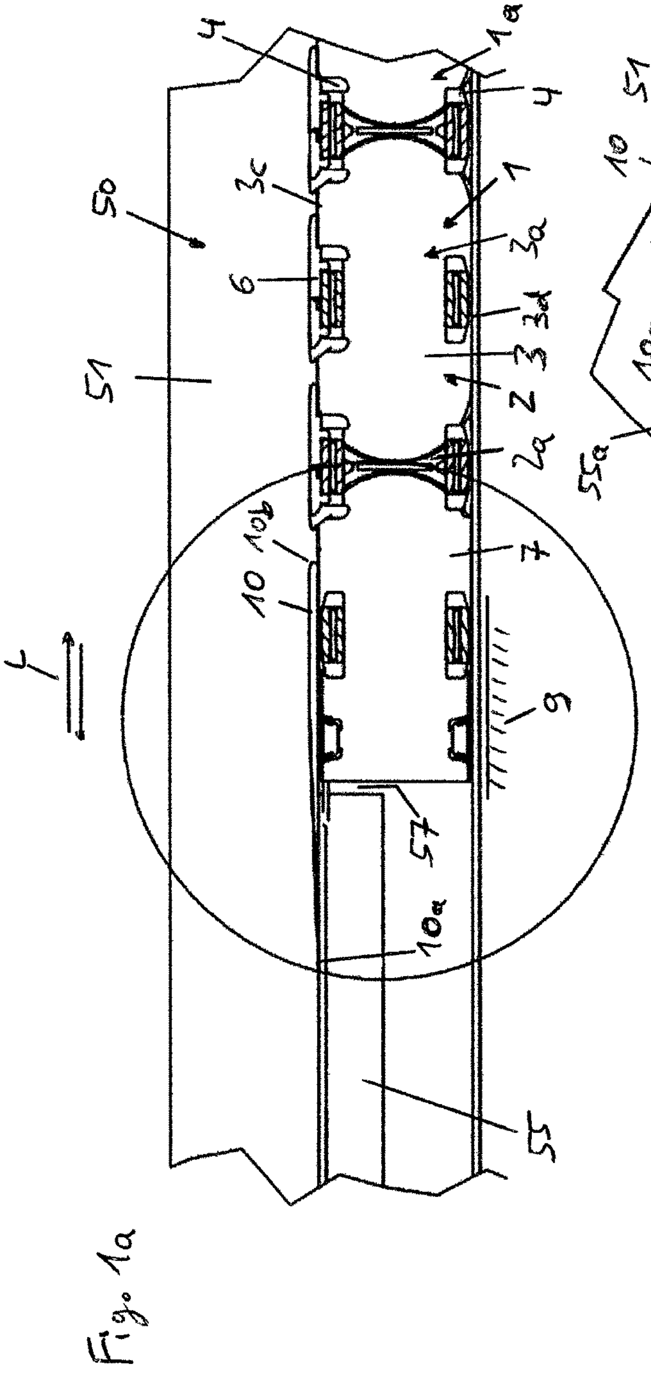
Figure 1B:
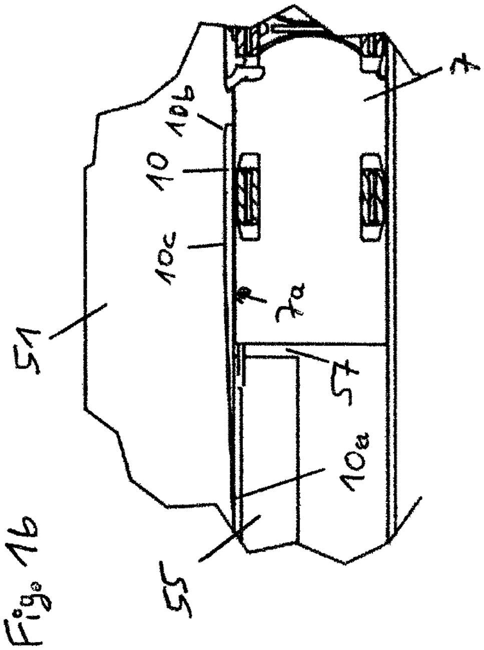

According to FIGS. 1 and 2, the free ends of the slide rail 50 or both slide rails are spaced apart from the end-securing part 7 by a gap 57 at the two channel legs 51 in the longitudinal direction of the chain. The ramp-type element is arranged on the end-securing part 7 in such a way that the end region with the pointed end 10*a* bridges the gap 57 between the end-securing part 7 and the slide rail 55 at least partially or, in this case, completely. In this case, the ramp-type element 10, in its secured position on the chain, covers the end region 55*b* of the slide rail and rests against the slide rail upper side 55*a* with a certain preload or optionally also without preload.

The taper of the ramp-type element is thus formed by a reduction in the cross-section of the ramp-type element, more specifically by a reduction in the cross-sectional height of the ramp-type element. The tapering region of the ramp-type element tapers here steadily and with a constant incline over the longitudinal extent of the ramp-type slope. The tapering region of the ramp-type element here forms the ramp-type slope of the ramp-type element. In this case, the tapering region of the ramp-type element or the ramp-type slope extends over approximately 66% of the length of the ramp-type element.

The horizontal section of the ramp-type element extends over approximately 33% of the length of the ramp-type element in its secured arrangement. The securing means of the ramp-type element for securing the same to the end-securing part of the drag chain are arranged on the horizontal section of the ramp-type element. The pointed end of the ramp-type element does not have such securing means. The upper side and/or the lower side of the horizontal section of the ramp-type element are plane. In the mounted state of the ramp-type element, the upper side and/or the underside of the horizontal section of the ramp-type element run parallel to the upper side of the slide rail, on which the upper track can be placed, and/or parallel to the narrow side of the end-securing part, with the ramp-type element facing or preferably lying flat against the narrow side of the end-securing part in the mounting arrangement.

In this case, the slide rails are arranged horizontally—i.e. in the horizontal spatial direction. The slide rails are designed in a straight line.

In the mounting arrangement of the ramp-type element on the end-securing part, in particular with the ramp-type element abutting the slide rail, the underside of the ramp-type element facing the end-securing part or the slide rail extends horizontally with respect to the spatial direction or in straight extension and flush with the upper side of the narrow side of the end-securing part, according to the exemplary embodiment.

Securing the ramp-type element "to the chain" should be understood in each case in particular as securing to the "end-securing part".

What is claimed is:

1. A drag chain for guiding cables between two connection points, the drag chain comprising:

a plurality of chain links connected to one another in an articulated manner and succeeding each other in a longitudinal direction of the drag chain, wherein the chain links each have mutually opposite plates which are spaced apart laterally from one another and each have an inner and an outer side surface and each have two narrow sides which are opposite one another with respect to a plate height, wherein at least some or all of the chain links have at least one crosspiece which connects the plates of the respective chain link to one another, wherein the mutually opposite plates and the at least one crosspiece form a receiving space for at least one cable, wherein the drag chain is arrangeable and moved by forming a lower track, an upper track and a deflection region connecting the lower track and the upper track, with the upper track being placed on the lower track, wherein the chain links of the lower track and/or upper track are fitted or are fittable with additional elements on a side facing the respective other track, the drag chain having an end-securing part which is coupled to an end link of the lower track of the drag chain and which has connection-securing means to secure the end-securing part to a connection point or said chain is secured to a stationary connection point by the connection-securing means, wherein at least one wedge-shaped ramp-type element is provided, the wedge-shaped ramp-type element has a pointed end and a broad end, which are spaced apart from one another in the longitudinal direction of the drag chain, in that the wedge-shaped ramp-type element is a separate element with respect to the end securing part of the lower track and is attached to the end-securing part of the lower track on the side of the end-securing part facing the upper track, the wedge-shaped ramp-type element is arranged or is arrangeable on the end-securing part with a longitudinal direction at least substantially parallel to the longitudinal direction of the chain, wherein, in a secured arrangement on the drag chain, the wedge-shaped ramp-type element tapers in a direction leading away from the deflection region and an upper side of the wedge-shaped ramp-type element facing the upper track forms a ramp-type surface for the upper track.

2. The drag chain according to claim 1, wherein in the secured arrangement of the wedge-shaped ramp-type element on the drag chain, the ramp-type surface at the broad end of the wedge-shaped ramp-type element is arranged at least substantially at a level of a sliding surface of a sliding element adjacent in the longitudinal direction of the drag chain or at least substantially at a level of the upper side of an additional element of the additional elements adjacent in the longitudinal direction of the drug chain.

3. The drag chain according to claim 1, wherein the pointed end of the wedge-shaped ramp-type element in the secured arrangement on the drag chain protrudes from a free end of the end-securing part.

4. The drag chain according to claim 1, wherein the wedge-shaped ramp-type element is arranged on side parts of the end-securing part.

5. The drag chain according to claim 1, wherein the wedge-shaped ramp-type element is securable or is secured to the end-securing part.

6. The drag chain according to claim 5, wherein the wedge-shaped ramp-type element is detachably securable or is detachably secured to the end-securing part.

7. The drag chain according to any claim 1, wherein the end-securing part has a plurality of connection point securing regions for securing the end-securing part to the connection point in different spatial arrangements and the wedge-shaped ramp-type element is secured to or is securable to a connection point securing region of the end-securing part.

8. The drag chain according to claim 1, wherein the wedge-shaped ramp-type element has integrally formed securing means which correspond to connection point securing regions of the end-securing part.

9. The drag chain according to claim 1, wherein the wedge-shaped ramp-type element is at least substantially rigid.

10. The drag chain according to claim 1, wherein the wedge-shaped ramp-type element is elastically deformable.

11. The drag chain according to claim 1, wherein at least the ramp-type surface of the wedge-shaped ramp-type element consists of a material with low sliding friction and/or higher wear resistance compared to chain plate material.

12. The drag chain according to claim 1, wherein a length of the wedge-shaped ramp-type element is greater than or equal to 0.5 times a length of the end-securing part.

13. The drag chain according to claim 7, wherein the end-securing part has an upper narrow side facing the upper track and/or a lower narrow side facing away from the upper track and/or an end side facing away from the drag chain and at least two connection point securing regions are provided on at least two sides of the end-securing part selected from the group of upper narrow side, lower narrow side and end side.

14. The drag chain according to claim 1, wherein the wedge-shaped ramp-type element comprises a first portion and a second portion, wherein the wedge-shaped ramp-type element is secured to the end-securing part of the lower track on top of the side of the end-securing part facing the upper track, wherein the first portion of the wedge-shaped ramp-type element is overlapping with the side of the end-securing part facing the upper track and wherein the second portion of the wedge-shaped ramp-type element is protruding from the side of the end-securing part facing the upper track in the longitudinal direction of the drag chain.

15. A drag chain for guiding cables between two connection points, the drag chain comprising:

a plurality of chain links connected to one another in an articulated manner and succeeding each other in a longitudinal direction of the drag chain, wherein the chain links each have mutually opposite plates which are spaced apart laterally from one another and each have an inner and an outer side surface and each have two narrow sides which are opposite one another with respect to a plate height, wherein at least some or all of the chain links have at least one crosspiece which connects the plates of the respective chain link to one another, wherein the mutually opposite plates and the at least one crosspiece form a receiving space for at least one cable, wherein the drag chain is arrangeable and moved by forming a lower track, an upper track and a deflection region connecting the lower track and the upper track, with the upper track being placed on the lower track, wherein the chain links of the lower track and/or upper track are fitted or are fittable with additional elements on a side facing the respective other track, the drag chain having an end-securing part which is coupled to an end link of the lower track of the drag chain and which has connection-securing means to secure the end-securing part to a connection point or said chain is secured to a stationary connection point by the connection-securing means, wherein at least one wedge-shaped ramp-type element is provided, the wedge-shaped ramp-type element has a pointed end and a broad end, which are spaced apart from one another in the longitudinal direction of the drag chain, in that the wedge-shaped ramp-type element is a separate element with respect to the end securing part of the lower track and is attached to the end-securing part of the lower track on the side facing the upper track, the wedge-shaped ramp-type element is arranged or is arrangeable on the end-securing part with a longitudinal direction at least substantially parallel to the longitudinal direction of the chain, wherein, in a secured arrangement on the drag chain, the wedge-shaped ramp-type element tapers in a direction leading away from the deflection region and an upper side of the wedge-shaped ramp-type element facing the upper track forms a ramp-type surface for the upper track, wherein the end-securing part has a plurality of connection point securing regions for securing the end-securing part to the connection point in different spatial arrangements and the wedge-shaped ramp-type element is secured to or is securable to a connection point securing region of the end-securing part.

16. The drag chain according to claim 15, wherein the end-securing part has an upper narrow side facing the upper track and/or a lower narrow side facing away from the upper track and/or an end side facing away from the drag chain and at least two connection point securing regions are provided on at least two sides of the end-securing part selected from the group of upper narrow side, lower narrow side and end side.

* * * * *